(12) United States Patent
Nguyen et al.

(10) Patent No.: US 11,738,774 B2
(45) Date of Patent: *Aug. 29, 2023

(54) ROADSIDE ASSISTANCE FOR AUTONOMOUS VEHICLES

(71) Applicant: Waymo LLC, Mountain View, CA (US)

(72) Inventors: Son-Ca Nguyen, Mountain View, CA (US); Salil Pandit, Palo Alto, CA (US); Noah Eisen, San Francisco, CA (US); Renaud-Roland Hubert, Gilroy, CA (US); Lauren Tindal, San Francisco, CA (US); Jessica Gong, San Jose, CA (US); Lorena Zalles, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,873

(22) Filed: Feb. 22, 2022

(65) Prior Publication Data

US 2022/0219735 A1 Jul. 14, 2022

Related U.S. Application Data

(63) Continuation of application No. 16/916,551, filed on Jun. 30, 2020, now Pat. No. 11,285,968.

(51) Int. Cl.
*B60W 60/00* (2020.01)
*G05D 1/00* (2006.01)
(Continued)

(52) U.S. Cl.
CPC ......... *B60W 60/0025* (2020.02); *B60R 25/01* (2013.01); *B60R 25/10* (2013.01);
(Continued)

(58) Field of Classification Search
CPC .. B60W 60/0025; B60W 40/08; B60W 10/30; B60W 2510/1005; B60R 25/01;
(Continued)

(56) References Cited

U.S. PATENT DOCUMENTS

| 7,373,225 | B1 * | 5/2008 | Grier | G07C 5/008 |
| | | | | 340/439 |
| 7,551,993 | B1 * | 6/2009 | Cancilla | G06Q 10/06 |
| | | | | 340/439 |

(Continued)

FOREIGN PATENT DOCUMENTS

| CN | 107850895 A | 3/2018 |
| CN | 111094097 A | 5/2020 |

(Continued)

OTHER PUBLICATIONS

The First Office Action for Chinese Patent Application No. 202110726446.2, dated Apr. 26, 2023, 20 Pages.

*Primary Examiner* — Babar Sarwar
(74) *Attorney, Agent, or Firm* — Botos Churchill IP Law

(57) ABSTRACT

Aspects of the disclosure relate to enabling roadside assistance to a vehicle that requires assistance having an autonomous driving mode. For instance, a technician may be assigned to the vehicle that requires assistance. A signal corresponding to user input at a remote computing device requesting a change to a state of the vehicle may be received. The signal may be based on details of the assigned technician. Based on the validation, an instruction may be sent to the vehicle to change the state of the vehicle.

20 Claims, 7 Drawing Sheets

(51) Int. Cl.
*G01C 21/34* (2006.01)
*B60W 40/08* (2012.01)
*B60W 10/30* (2006.01)
*B60R 25/10* (2013.01)
*B60R 25/102* (2013.01)
*B60R 25/01* (2013.01)
*G01S 19/42* (2010.01)

(52) U.S. Cl.
CPC .......... *B60R 25/102* (2013.01); *B60W 10/30* (2013.01); *B60W 40/08* (2013.01); *G01C 21/3407* (2013.01); *G05D 1/0016* (2013.01); *B60R 2025/1013* (2013.01); *B60W 2510/1005* (2013.01); *G01S 19/42* (2013.01)

(58) Field of Classification Search
CPC ............... B60R 25/102; B60R 25/10; B60R 2025/1013; G01C 21/3407; G05D 1/0016; G01S 19/42; G06N 3/08; G06N 20/00; G06Q 50/01; G06Q 50/30; G07C 5/008; G10L 15/22; G10L 2015/223; G10L 25/30; G10L 15/26; G08G 1/205; H04W 4/40
See application file for complete search history.

(56) References Cited

U.S. PATENT DOCUMENTS

| | | | | |
|---|---|---|---|---|
| 8,583,320 | B2 * | 11/2013 | Harris | H04L 67/52 340/995.25 |
| 8,996,224 | B1 * | 3/2015 | Herbach | G05D 1/0027 701/25 |
| 9,091,558 | B2 * | 7/2015 | Su | B60W 30/165 |
| 9,672,520 | B1 * | 6/2017 | Brandmaier | G06Q 20/12 |
| 9,720,410 | B2 * | 8/2017 | Fairfield | G05D 1/0011 |
| 10,096,176 | B1 * | 10/2018 | Namineni | G07C 5/008 |
| 10,248,116 | B2 * | 4/2019 | Okumura | B60W 30/00 |
| 10,553,119 | B1 * | 2/2020 | Shah | G06N 3/08 |
| 10,789,789 | B1 * | 9/2020 | Edman | G07C 5/085 |
| 10,885,725 | B2 * | 1/2021 | Rodriguez Bravo | G05D 1/0061 |
| 2005/0075767 | A1 * | 4/2005 | Dasti | G06Q 10/06 455/414.1 |
| 2005/0240343 | A1 * | 10/2005 | Schmidt, II | G07C 5/085 701/1 |
| 2006/0142910 | A1 * | 6/2006 | Grier | G06Q 10/06 701/31.4 |
| 2009/0006018 | A1 * | 1/2009 | Hutchins | G06Q 10/06 702/82 |
| 2009/0190735 | A1 * | 7/2009 | Gilmartin | G10L 17/00 379/201.12 |
| 2011/0143670 | A1 * | 6/2011 | Farrell | H04W 4/12 455/41.2 |
| 2013/0253765 | A1 * | 9/2013 | Bolourchi | B62D 15/025 701/41 |
| 2014/0163811 | A1 * | 6/2014 | Petersen | G06F 17/00 701/32.8 |
| 2015/0248131 | A1 * | 9/2015 | Fairfield | G05D 1/0027 701/2 |
| 2015/0254986 | A1 * | 9/2015 | Fairfield | G08G 1/161 707/687 |
| 2016/0092962 | A1 * | 3/2016 | Wasserman | H04M 3/487 705/26.7 |
| 2018/0091604 | A1 * | 3/2018 | Yamashita | G06Q 20/28 |
| 2018/0096539 | A1 * | 4/2018 | Merg | G07C 5/02 |
| 2018/0370543 | A1 * | 12/2018 | Poeppel | B60K 35/00 |
| 2019/0102959 | A1 * | 4/2019 | Saylor | G07C 5/006 |
| 2019/0197647 | A1 * | 6/2019 | Battleson | G06Q 50/30 |
| 2019/0311546 | A1 * | 10/2019 | Tay | G05D 1/0088 |
| 2020/0184591 | A1 * | 6/2020 | Balu | G07C 5/006 |
| 2021/0048814 | A1 * | 2/2021 | Ghorbanian-Matloob | G05D 1/0016 |
| 2021/0197702 | A1 * | 7/2021 | Krishnamurthi | G05D 1/0295 |
| 2022/0252411 | A1 * | 8/2022 | Gardiner | G06Q 10/0631 |

FOREIGN PATENT DOCUMENTS

| | | | | |
|---|---|---|---|---|
| WO | | 2016183525 | A1 | 11/2016 |
| WO | | 2020072501 | A1 | 4/2020 |
| WO | WO-2020072501 | A1 * | 4/2020 | ............... G06N 3/08 |

\* cited by examiner

ROADSIDE ASSISTANCE FOR AUTONOMOUS VEHICLES

CROSS REFERENCE TO RELATED APPLICATIONS

This application is a continuation of U.S. application Ser. No. 16/916,551, filed Jun. 30, 2020, the entire disclosure of which is incorporated by reference herein.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. However, in some situations, autonomous vehicles may no longer be able to make forward progress towards a destination of the vehicle and thus may require human intervention or assistance. In addition, such vehicles may not have a "driver" who is able to take control of the vehicle and/or address the reason why the vehicle requires assistance.

SUMMARY

Figure 1:
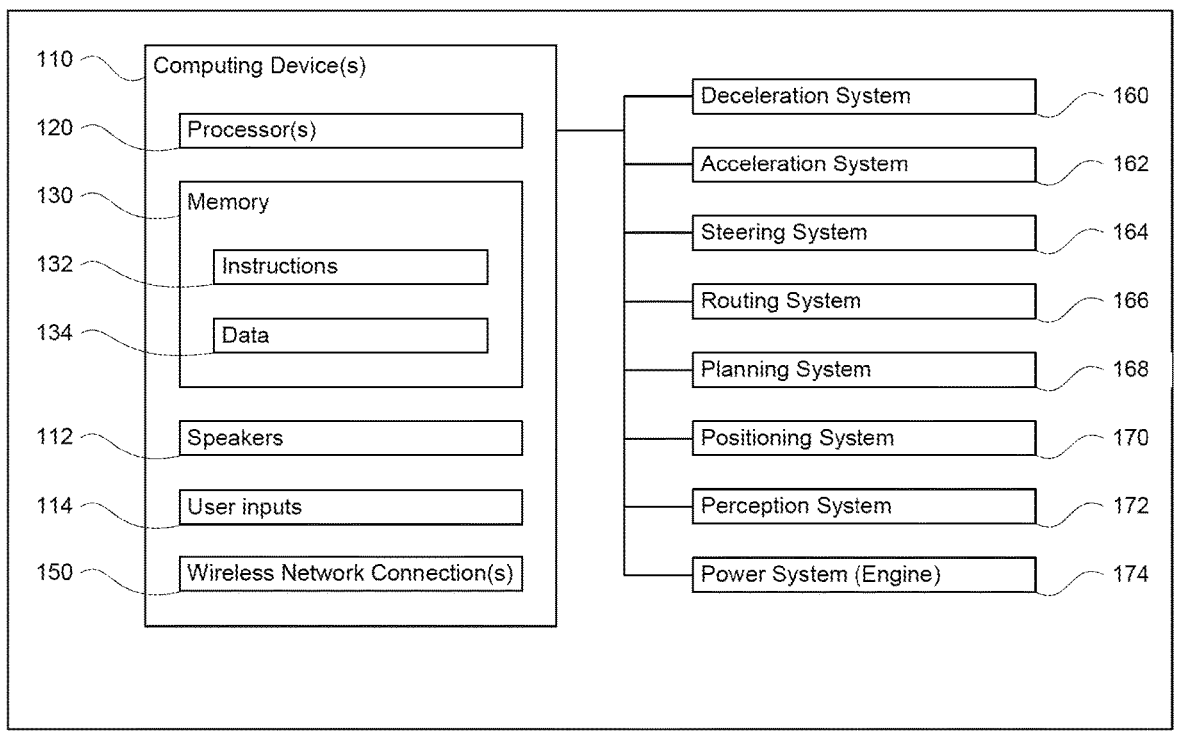
FIG. 1 is a functional diagram of an example vehicle in accordance with an exemplary embodiment.

Aspects of the disclosure provide a method enabling roadside assistance to a vehicle that requires assistance having an autonomous driving mode. The method includes assigning, by one or more processors of one or more server computing devices, a technician to the vehicle, the vehicle being unable to make progress towards a destination of the vehicle; receiving, by one or more processors, a signal corresponding to user input at a remote computing device requesting a change to a state of the vehicle; validating, by the one or more processors, the signal based on details of the assigned technician; and based on the validation, sending, by the one or more processors, an instruction to the vehicle to change the state of the vehicle.

In one example, the method also includes sending a notification to the remote computing device indicating that the technician has been assigned to the vehicle. In another example, the method also includes sending information to the remote computing device identifying a location of the vehicle. In another example, the method also includes sending information to the remote computing device including a route and driving instructions for the remote computing device to reach a location of the vehicle. In this example, the method also includes sending to the remote computing device an estimated time of arrival for the remote computing device to reach the location of the vehicle. In another example, the method also includes sending to the remote computing device information identifying whether the vehicle has a passenger. In another example, the method also includes sending to the remote computing device information identifying whether the vehicle has a passenger. In another example, the method also includes sending to the remote computing device information identifying a current gear of the vehicle. In another example, the method also includes sending to the remote computing device information identifying a driving mode of the vehicle. In another example, the state includes raising or lowering windows of the vehicle. In another example, the state includes locking or unlocking one or more doors of the vehicle. In another example, the state includes honking a horn of the vehicle. In another example, the state is whether or not the vehicle can be assigned to a new trip to transport one or more passengers or goods. In another example, the state includes whether the vehicle is parked. In another example, the state includes whether the vehicle is being held. In another example, the state includes that the vehicle is operating in the autonomous driving mode and not a manual driving mode. In another example, validating the signal includes confirming that the assigned technician is qualified to change the state of the vehicle. In another example, validating the signal includes confirming that a user associated with the remote computing device is assigned with the assigned technician. In another example, validating the signal includes confirming that a user associated with the remote computing device is currently working for the roadside assistance.

DETAILED DESCRIPTION

Overview

The technology relates to enabling roadside assistance for autonomous vehicles, especially in situations in which such vehicles may no longer be able to make forward progress towards a destination of the vehicle and thus may require human intervention or assistance. In addition, such vehicles may not have a "driver" who is able to take control of the vehicle and/or address the reason why the vehicle requires assistance. As used herein, the phrases "requires human intervention" and "requires assistance" may refer to situations in which a vehicle's computing device or operator decides that the optimal action is to bring the vehicle to a stop despite the ability to continue making forward progress, situations where a hardware or software issue may cause the vehicle to come to a stop, or a combination thereof.

As one instance, the computing devices of a vehicle in the autonomous driving mode may require assistance because the vehicle is unable to make forward progress towards its destination. For instance, a vehicle's computing devices may detect a problem that may inhibit forward progress of a vehicle, such as a stationary obstacle blocking a portion of the roadway or low tire pressure which may be caused, for example, due to a slow leak or puncture in a tire of the vehicle. In response, the computing devices may stop the vehicle immediately in a lane or by pulling the vehicle over depending upon the situation. At this point in time, the vehicle would require assistance. As another instance, if the vehicle's computing devices detect a software or hardware issue with any of the features of the autonomous control system, the vehicle may enter a "fallback state" or a mode of degraded operation. In such instances, the vehicle's computing devices may bring the vehicle to a stop again causing the vehicle to require assistance. As another instance, if the computing devices detect input of a particular force at certain user inputs of the vehicle (e.g. brake pedal, accelerator pedal, steering wheel, pullover button, emergency stopping button etc.), devices may stop the vehicle (e.g. pull the vehicle over or stop immediately), causing the vehicle to require assistance. As another instance, the vehicle's computing devices receive instructions from a remote computing device to stop or pull over. For example, in certain circumstances, a human operator may determine that it is no longer safe or practical for a vehicle to continue operating in an autonomous driving mode. This may occur for any number of reasons, such as if the passenger requests assistance (via a user input of the vehicle and/or his or her mobile phone), etc.

When a vehicle requires assistance, this may be referred to as a "service interruption." In such cases, one or more server computing devices which monitor the state of a fleet of vehicles may assign a human technician to the vehicle that requires assistance in order to provide roadside assistance. Such assignments may be done on the basis of current availability, future availability, location, training, etc. for technicians which are currently working. Once a technician is assigned to a vehicle that requires assistance, the technician must be able to navigate to the vehicle that requires assistance, enter the vehicle, disengage the autonomous driving mode of the vehicle, and control the vehicle manually and/or reengage the autonomous driving mode.

A technician may receive information at the client computing device via an application or web portal. For instance, the technician may be required to login to the application and/or otherwise authenticate his or herself. Thereafter, the application may provide notifications and information to the technician about assigned vehicles. This information may be provided to the client computing device by the one or more server computing devices as push notifications.

The application or web portal may also enable a technician to communicate certain information to the one or more server computing devices and/or the computing devices of the vehicle that requires assistance. Once the technician provides input to the application, a signal may be sent to the one or more server computing devices rather than directly to the vehicle that requires assistance. This may ensure that all of the signals are processed by a server computing device and are validated or verified prior to the one or more server computing devices sending a corresponding command to the vehicle that requires assistance.

Once validation or verification is completed, the one or more server computing devices may either send an error message to the technician's client computing device or may send a confirmation to the client computing device. If a confirmation is sent, the one or more server computing devices may also send an instruction to the vehicle that requires assistance to cause the vehicle to respond according to the technician's input.

The features described herein may enable roadside assistance for autonomous vehicles, especially in situations in which such vehicles require assistance. The aforementioned application may enable communications between a technician and a vehicle indirectly in order to prevent the vehicle from receiving unauthorized commands through the applications.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 112 as well as one or more user inputs 114. The speakers may enable the computing devices to provide audible messages and information, such as the alerts described herein, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi-autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode. In this regard, each of these systems may include one or more processors, memory, data and instructions. Such processors, memories, instructions and data may be configured similarly to one or more processors 120, memory 130, instructions 132, and data 134 of computing device 110.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features. While the map information may be an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map and/or on the earth. The positioning system 170 may also include a GPS receiver to determine the device's latitude, longitude and/or altitude position relative to the Earth. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 2:
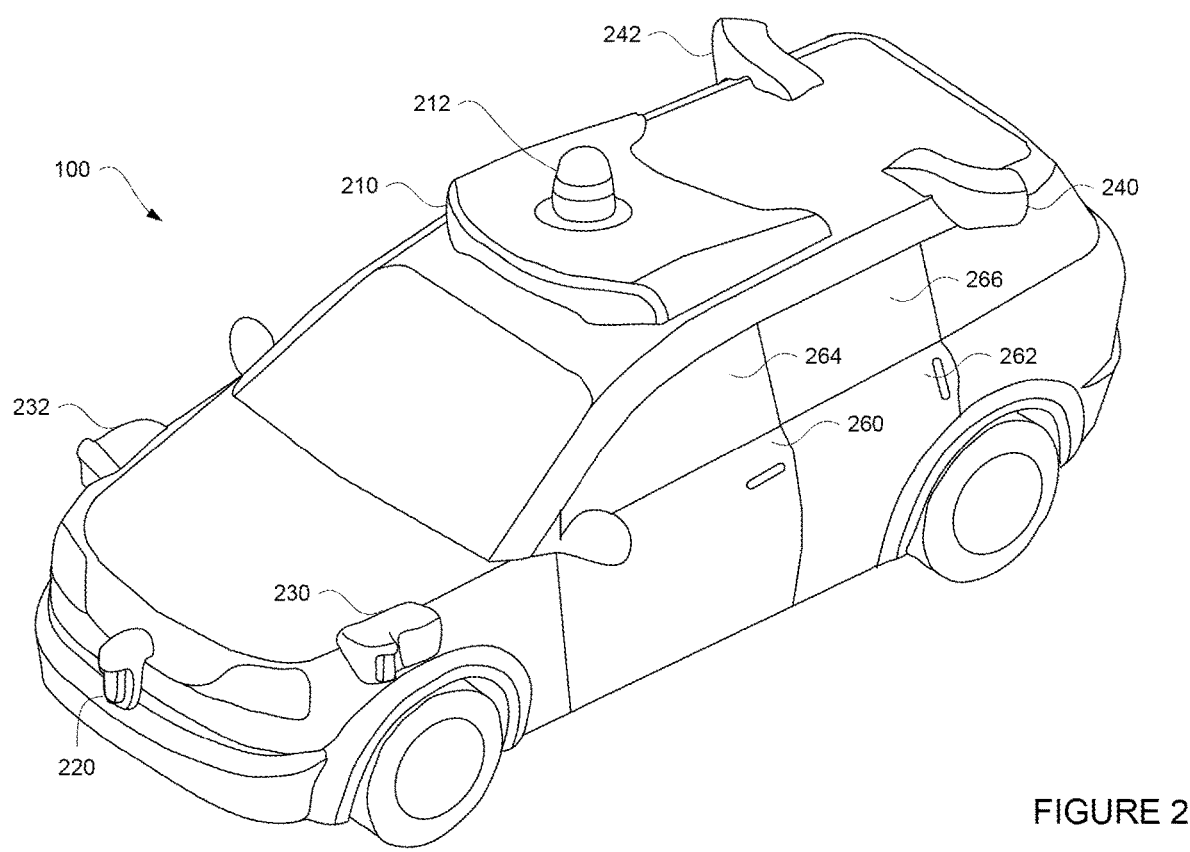
FIG. 2 is an example diagram of a vehicle in accordance with aspects of the disclosure.

For instance, FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of doors 260, 262 which also include windows 264, 266. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be input into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system software module configured to detect emergency vehicles, etc. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

Computing devices 110 may also include one or more wireless network connections 150 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach a location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 3:
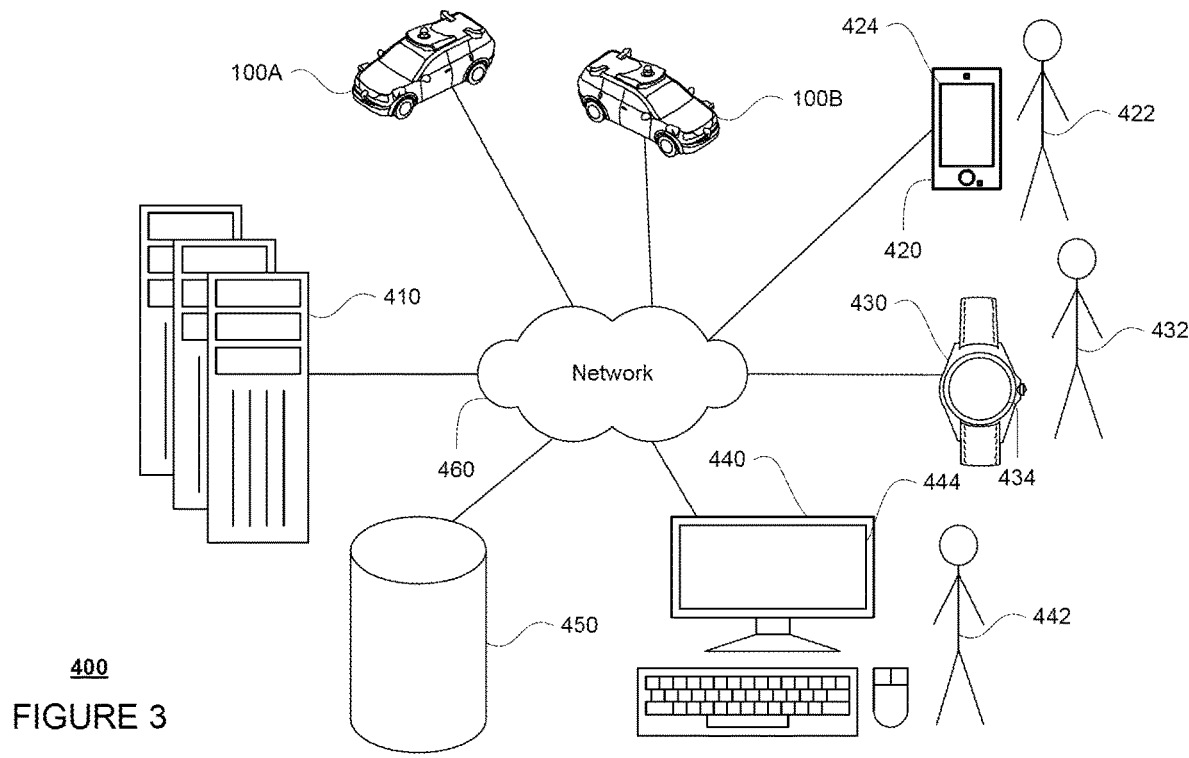
FIG. 3 is an example pictorial diagram of a system in accordance with aspects of the disclosure.
Figure 4:
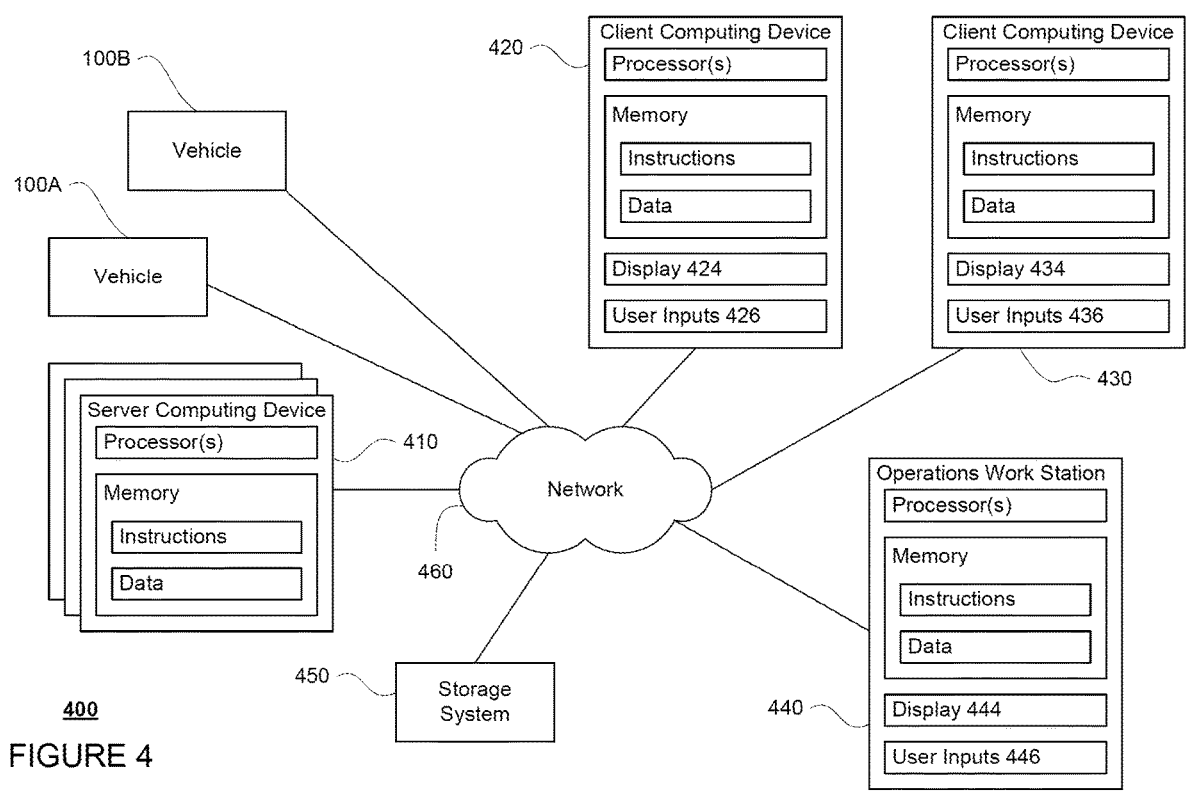
FIG. 4 is an example functional diagram of a system in accordance with aspects of the disclosure.

Computing device 110 of vehicle 100 may also receive or transfer information to and from other computing devices, such as those computing devices that are a part of the transportation service as well as other computing devices. FIGS. 3 and 4 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, instructions and data. Such processors, memories, data and instructions may be configured similarly to one or more processors 120, memory 130, instructions 132 and data 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including one or more processors (e.g., a central processing unit (CPU)), memory (e.g., RAM and internal hard drives) storing data and instructions, a display such as displays 424, 434, 444 (e.g., a monitor having a screen, a touchscreen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise client computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, depicted as a smart watch as shown in FIG. 4. As an example the user may input information using a small keyboard, a keypad, microphone, using visual signals with a camera, or a touch screen.

In some examples, client computing device 420 may be a mobile phone used by a technician as discussed further below. In other words, user 422 may represent a technician. In addition, client communication device 430 may represent a smart watch for a passenger of a vehicle. In other words, user 432 may represent a passenger. The client communication device 430 may represent a workstation for an operations person, for example, someone who may provide remote assistance to a vehicle and/or a passenger. In other words, user 442 may represent an operations person. Although only a single technician, passenger, and operations person are shown in FIGS. 3 and 4, any number of such technicians, passengers, and operations personnel (as well as their respective client computing devices) may be included in a typical system. Moreover, although this client computing devices are depicted as a mobile phone, a smart watch, and a workstation, respectively, such devices used by technicians may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information stored in the storage system 450 may be retrieved or otherwise accessed by a server computing device, such as one or more server computing devices 410, in order to perform some or all of the features described herein. For example, as described in further detail below, the one or more server computing devices may also track the progress of a vehicle from the beginning of a service interruption (e.g. a vehicle requires assistance) to the end of such an interruption. In this regard, the storage system may store the state of vehicles during such an interruption. For example, states may progress from interrupted, technician dispatched, technician arrived, technician driving the vehicle, and interruption ended.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Each vehicle of the fleet may constantly report its state to one or more server computing devices, such as the server computing devices 410. In this regard, the one or more server computing devices may constantly monitor the states of these vehicles and track these states in the storage system 450 as discussed above.

These reports may be sent periodically via a network, such as network 460, and may include various information about the state of the vehicle, including, for example, the vehicle's location and other telemetry information such as orientation, heading, etc., a current destination, the passenger state of the vehicle, the current gear of the vehicle (e.g. park, drive, reverse), as well as the driving mode or other state of the vehicle (e.g. whether the vehicle is still operating autonomously, etc.). The passenger state may identify whether there are passengers and if the vehicle is "hailable" or can be hailed for another trip. In some instances, the reports may also identify whether a vehicle requires assistance and also the reason why the vehicle requires assistance (e.g. low tire pressure or an emergency stop requested by a passenger). As noted above, for any number of reasons including those discussed above, a vehicle of a fleet of autonomous vehicles, such as vehicle 100, may require assistance. Alternatively, the computing devices 110 may sent a specific request for assistance when the vehicle requires assistance.

Figure 7:
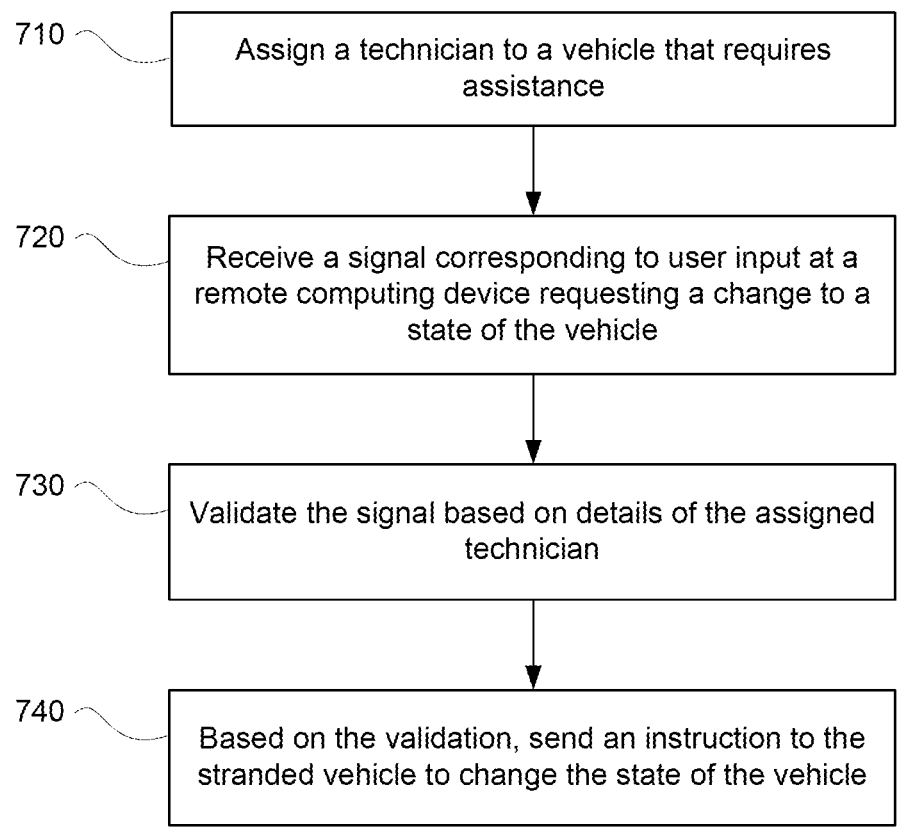
FIG. 7 is an example flow diagram in accordance with aspects of the disclosure.

FIG. 7 includes an example flow diagram 700 of some of the examples for generating simulated degraded sensor data, which may be performed by one or more processors such as the processors of one or more server computing devices 410 in order to enable roadside assistance. For instance, at block 710, a technician is assigned to a vehicle that requires assistance. In response to a report that a vehicle requires assistance, the one or more server computing devices 410 may assign a human technician to the vehicle that requires assistance again, in order to provide roadside assistance to the vehicle that requires assistance. Such assignments may be done on the basis of current availability, future availability, location, training (e.g. can this technician address this type of problem or provide this type of assistance to the vehicle), etc. for technicians which are currently working.

Once a technician is assigned to a vehicle that requires assistance, the technician must be able to navigate to the vehicle that requires assistance, enter the vehicle, disengage the autonomous driving mode of the vehicle, and control the vehicle manually and/or reengage the autonomous driving mode. For example, if there is a passenger in the vehicle, the technician must be able to get the vehicle to the passenger's destination, and if there is no passenger in the vehicle, the technician must be able to drive the vehicle to another location (e.g. a depot or other location) and, in some instances, reengage the autonomous driving mode. In order to enable such actions, the technician may utilize an application on a client computing device such as a tablet or mobile phone.

A technician may receive information at the client computing device via an application or web portal. For instance, the technician may be required to login to the application and/or otherwise authenticate himself or herself. Thereafter, the application may provide notifications (e.g. "You have been assigned to respond to a vehicle") and information to the technician about the state of assigned vehicles for which the technician can provide roadside assistance. The information may include the reason that a vehicle requires assistance (e.g., a stationary obstacle, low tire pressure, software or hardware issue, pullover initiated by passenger, pullover initiated by a remote computing device), location of the vehicle, details about the location, a route and driving directions from the client computing device's current location to the vehicle, an estimated time of arrival for the client computing device to reach the vehicle, the passenger state of the vehicle (whether there are passengers and if the car can be hailed for another trip, though the default may be "not hailable" when a vehicle requires assistance), the current gear of the vehicle (e.g. park, drive, reverse), as well as the driving mode or other state of the vehicle (e.g. whether the vehicle is still operating autonomously, etc.), as well as instructions for actions to take upon arrival at the vehicle.

Examples of details about the location may include information such as the speed limit of the road on which the vehicle requires assistance, whether there are nearby emergency vehicles, whether emergency vehicles have blocked an intersection, etc. This information may be determined by the vehicle that requires assistance itself and reported to the server computing devices 410 as part of reporting the need for assistance or generally. In addition or alternatively, when a vehicle requires assistance, it may be automatically connected with an operations person, such as user 422, who may identify such information and provide it to the server computing devices 410. In addition, examples of instructions may include, for example, to approach carefully if the vehicle that requires assistance is on a high-speed road or near emergency vehicles, and may also include a reminder to the technician to identify him or herself to emergency personnel prior to approaching the vehicle.

This information may be provided to the client computing device 420 by the one or more server computing devices 410 as push notifications. In some instances, the volume of alerts for the notifications (e.g. a voice message, a tone, a jingle, or other audible alert) played at the client computing device may increase as the urgency of the notifications increases. Alternatively, the notifications may be more of a constant stream of data from the server computing devices to the client computing device. Information about a vehicle that requires assistance may be tracked by the one or more server computing devices based on periodic state reports from the vehicle (e.g. before, during and after the need for assistance arises).

Figure 5:
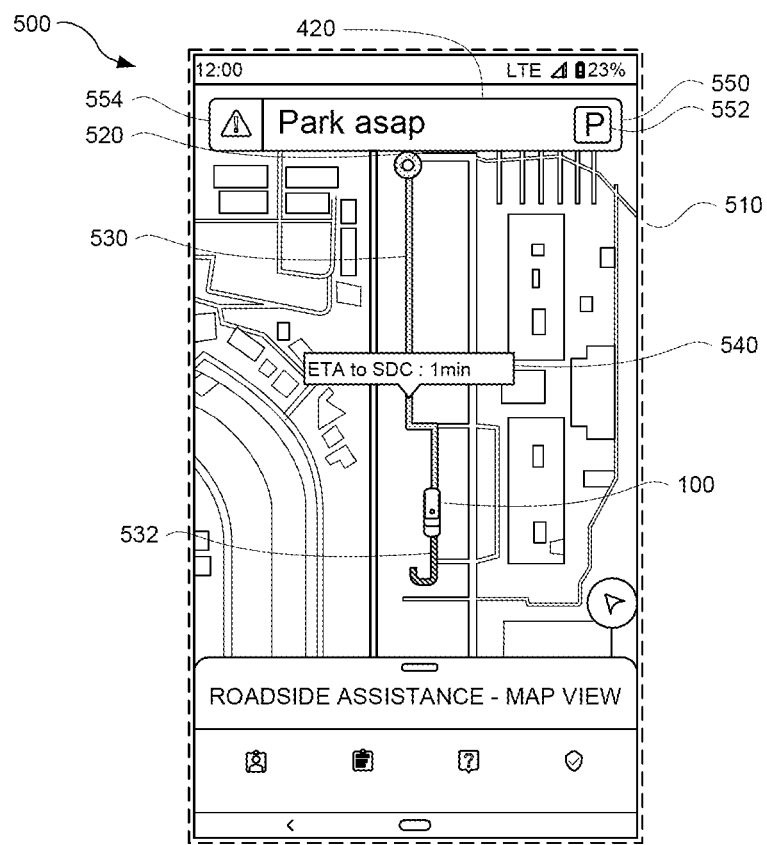
FIG. 5 is an example client computing device and screen image in accordance with aspects of the disclosure.

FIG. 5 is an example screen shot 500 which may be displayed on a client computing device, such as display 424 of client computing device 420 in order to provide information to a technician. In this example, vehicle 100 may be responding to a request by a passenger of the vehicle to pull over and park as soon as possible which may be made, for example, by using one of the user inputs 114. The computing devices 110 may send a report to the one or more server computing devices 410 notifying the server computing devices that vehicle 410 requires assistance. In this case, the vehicle has not yet pulled over and parked, but will shortly do so.

The screen shot 500 includes a map 510 identifying the location of the vehicle that requires assistance (here, vehicle 100) as well as the location of the client computing device 420 identified by marker 520. The map 510 includes a route 530 between these locations as well as an estimated time of arrival 540 for the technician to reach the vehicle 100 (when the vehicle has actually come to a stop) if following route 530. In addition, the screen shot 500 also identifies a route 532, which in this case, partially overlaps with route 530, that the vehicle 100 is following on the way to pull over and stop. A display bar 550 further identifies the current gear 552 of the vehicle, here P for park as well as the driving mode or other state 554 of the vehicle that requires assistance, here "Park asap" where the vehicle is attempting to pull over and stop as soon as possible in response to the aforementioned passenger request.

Figure 6:
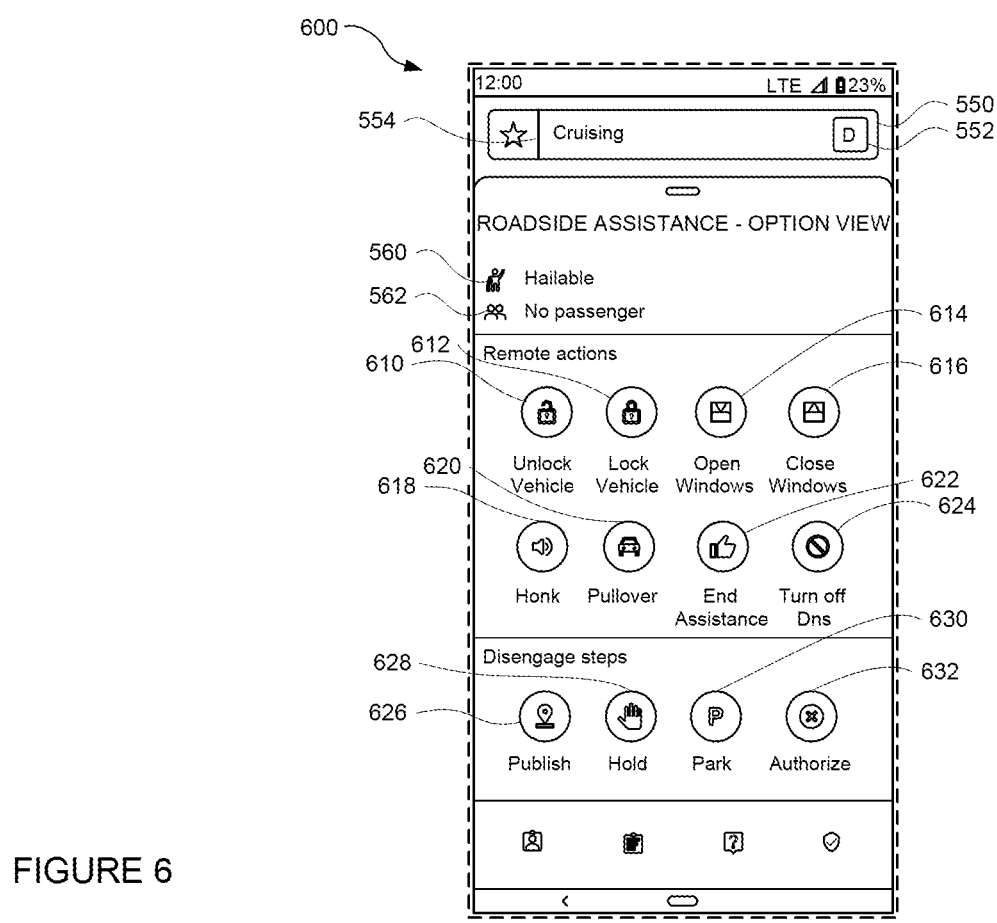
FIG. 6 is an example client computing device and screen image in accordance with aspects of the disclosure.

FIG. 6 is an example screenshot 600 which may be displayed on a client computing device, such as display 424 of client computing device 420 in order to provide information to a technician. In this example, the screen shot 600 provides information 560 identifying that the vehicle 100 is currently hailable, or rather able to accept new trips to transport passengers or goods. The screen shot 600 also provides information 562 indicating that the vehicle does not have any passengers. In addition, FIG. 6 provides another example of a driving mode or other state 554, here "cruise", to indicate that vehicle 100 is actively driving in the normal (e.g. not Park asap or another fallback mode) autonomous driving mode. Other examples of a driving mode or other state may include "parked" when the vehicle is parked or "fallback" when the vehicle is operating in a fallback state which requires the vehicle to pull over, not as urgently as with the "Park asap" state. In addition, FIG. 6 provides another example of a current gear 552 of the vehicle, here D for drive.

The application or web portal may also enable a technician to communicate certain information and request changes of the state of the vehicle to the one or more server computing devices and/or the computing devices of the vehicle that requires assistance. As shown in FIG. 6, screen shot 600 includes a plurality of options 610, 612, 614, 616, 618 to control various low-level states of the vehicle. For example, the application may provide options 610, 612 in order to allow the technician to request to lock and unlock doors (e.g. doors 260, 262). Similarly, the application may provide options 614, 616, 618 in order to allow the technician to request to open and close windows (e.g. windows 264, 266), and "honk" a horn of the vehicle (e.g. play a sound through speakers 112, honking or otherwise a horn of the vehicle).

The screen shot 600 also includes a plurality of options 620, 622, 624, 626, 628, 630 to request various state changes of the vehicle related to the autonomous driving mode and to communicate information to the server computing devices. For example, the "Pullover" option 620 may enable the technician to request that a planning system of the vehicle pullover at a safe, nearby location, for example, to pull over onto a shoulder or otherwise out of a lane if that is where the vehicle is stopped. This nearby location may be chosen by the computing devices 110 and/or some other system of the vehicle. The "end assistance" 622 option may enable the technician to send a notification to the server computing devices 410 to indicate that the vehicle no longer requires assistance. The "Turn off DNS" option 624 may be a "do not service" option which enables the technician to request to make the vehicle hailable. Once the technician arrives at the vehicle 100, he or she may use the "publish" option 626 to inform the one or more server computing devices 410 that he or she has reached the vehicle.

The "hold" and "park" options 628, 630, respectively, may request that vehicle will not begin to move when the technician approaches. The hold option may request that the vehicle's planning system bring the vehicle to a stop in a safe manner, then continue to stay still or stopped (but without shifting the car into park). This may be especially useful in areas where the vehicle is not permitted to drive autonomously, such as inside of a depot, or when the vehicle is ready to be serviced at a depot. The park option may request that the vehicle's planning system change the vehicle gear to park. In some circumstances, this command may only work if a hold has already been placed on the vehicle. As an alternative to having two distinct options, these functions may be combined into a single option.

The "authorize" option 632 may enable the technician to request that the vehicle enter a state in which the technician may disengage the autonomous driving mode, or rather, switch from the autonomous driving mode to a manual driving mode. Having this option in the application eliminates the need for the technician to physically connect another device to the vehicle in order to disengage the autonomous driving mode which can add several minutes onto a service interruption, which can be annoying to any passengers.

The technician may use any combination of the aforementioned options or others in order to provide roadside assistance and resolve the issue that caused the vehicle to requires assistance. This may involve the technician tapping on one or more of the aforementioned option, for instance, if the display 424 and/or input 426 is a touchscreen in order to send a request to the one or more server computing devices 410 to change a state of the vehicle. Other inputs, such as a stylus pen, by speaking a command, etc. may also be used, or if the technician's client computing device is not a mobile phone, any other input appropriate for such client computing devices.

As an example, once a technician arrives at the vehicle 100 (while the vehicle is awaiting assistance), the technician may tap on the publish option 626 in order to send a notification to the one or more server computing devices 410 indicating that the technician has arrived at the vehicle 100. In response, the server computing devices 410 may update the state of the vehicle 100 in the storage system 450.

Next, the technician may then tap the park option 630 (or a combined park and and hold option as discussed above) in order to request that the computing devices 110 cause the planning system 168 to change the vehicle gear to park. Thereafter, the technician may tap the authorize option 632 in order to request that the vehicle allows disengage of the autonomous driving mode and engage the manual driving mode. At this point, the technician may take manual control of the vehicle 100 and drive the vehicle to another location as needed. For example, this may include transporting a passenger of the vehicle to his or her destination or delivering cargo to its destination.

Once the technician has taken manual control of the vehicle and/or transported a passenger and/or cargo to a destination, the technician may also tap the end assistance option 622. At some point, either before or after tapping the authorize option, the technician may tap the Turn off DNS option 624. Doing so may replace this option with a "Turn on DNS" option which would allow the technician to request that the vehicle become hailable.

In some instances, the application may enable a mode in which the technician is able to request the planning system 168 to proceed to a new destination in the autonomous driving mode. In one implementation, the technician may do so by entering a destination into the application or web portal using an address, name or selecting from a predefined list (e.g. a drop-down menu listing nearby depots). This might be particularly helpful if a vehicle that requires assistance is reviewed or otherwise serviced by a technician, and then sent back to a depot for example if the technician has determined that the vehicle is safe enough to drive autonomously. This would allow the technician to be available for assignment to or to address another previously assigned vehicle.

Returning to FIG. 7, at block 720, a signal corresponding to user input at a remote computing device requesting a change to a state of the vehicle that requires assistance is received. Once the technician provides input, for instance by tapping on any of the aforementioned options 612, 614, 616, 618 620, 622, 624, 626, 628, 630, as described above, a signal may be sent from the client computing device 420 to the one or more server computing devices 410, for instance via a network such as the network 460, rather than directly to the vehicle that requires assistance. By sending the signal to the one or more server computing devices 410, this may ensure that all of the signals are for verification or validation by a server computing device prior to the vehicle that requires assistance acting upon any of the technician's request and thereby improving safety and security of the system.

At block 730, the signal is verified based on details of the assigned technician. For instance, the information (i.e. the request) in the signals may be crossed checked with a task assignment database in order to ensure that that the technician has the right credentials to request that the vehicle perform the action of the option used by the technician, the technician has been assigned to the vehicle, and the technician is currently working, or rather, that the technician is within the time bounds of his or her assigned shift for the day. For example, the one or more server computing devices 410 may confirm whether the technician has the proper qualifications to disengage the autonomous driving mode in a particular vehicle at the time the signal was generated.

At block 740, an instruction to the vehicle that requires assistance to change the state of the vehicle that requires assistance is sent based on the validation. Once validation or verification is completed, the one or more server computing devices 410 may either send an error message if the validation is not successful to client computing device 420 or may send a confirmation to the client computing device 420. If a confirmation is sent, the one or more server computing devices 410 may also send an instruction to the vehicle 100 to cause the vehicle to respond according to the technician's request. In this regard, the vehicle's computing devices 110 may lock or unlock the vehicle (options 610, 612), raise or lower the windows of the vehicle (options 614, 616), honk the horn (option 618), pullover the vehicle (option 620), end the need for assistance (option 622), turn on or off the DNS state (option 626), "hold" the vehicle as described above (option 628), cause the planning system 168 to change the vehicle gear to park (option 630), and/or transition to manual mode (authorize 632). Again, this may improve safety of the system and prevent unauthorized persons who may be able to access the application from actually controlling aspects of a vehicle, especially in situations where the application enables technicians to see the state (e.g. identifier, location, and speed) of a plurality of vehicles in the fleet of vehicles when the technician has not necessarily been assigned to those vehicles to address a need for assistance.

In some instances, if a connection between the client computing device 420 of the technician and the one or more server computing devices 410 is unavailable, for instance due to a lack of internet connection at the client computing device, once the technician arrives at the vehicle, the technician may be able to issue some commands to the vehicle directly via a Bluetooth or other near field communication between the client computing device and the vehicle's computing devices. In order to support this type of communication, it may be useful to have the vehicle's computing devices and the client computing device do a virtual handshake at the beginning of the shift, when the technician arrives at the vehicle that requires assistance, or at some other point in time. The client computing device may send a message to the vehicle's computing devices authenticating the client computing device for the duration of the technician's shift (or possibly, a smaller time frame, at which point the handshake would need to be done again at different points in time). Then, in the case of communication or even server failure, the vehicle's computing devices would know that the client computing device had previously been authenticated. Any communication from non-authenticated (no handshake) computing devices would not be acted upon.

The one or more server computing devices 410 may also track the progress of a vehicle from the beginning of a service interruption to the end of such an interruption as noted above using the storage system 450. For example, states may progress from interrupted, technician dispatched, technician arrived, technician driving the vehicle, and interruption ended. These states may be sent by the one or more server computing devices to the computing devices of the vehicle, the client computing device of the technician, any client computing device for a passenger of the vehicle, as well as other computing devices which may connect to the server such as a dispatching operator or rider support (customer service) operator. This may allow these devices to display information about the state of the roadside assistance being provided to the vehicle.

The features described herein may enable roadside assistance for autonomous vehicles, especially in situations in which such vehicles that require assistance. The aforementioned application may enable communications between a technician and a vehicle indirectly in order to prevent the vehicle from receiving unauthorized commands through the applications.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A client computing device used by a technician to provide roadside assistance to a vehicle having an autonomous driving mode, the client computing device comprising:
a display device configured to present a plurality of options from which the technician selects one or more of the plurality of options to resolve an issue that caused the vehicle to require the roadside assistance; and
one or more processors coupled with the display device, the one or more processors configured to:
receive one or more notifications from one or more server computing devices indicating that the technician has been assigned to the vehicle to provide the roadside assistance, and information regarding a location and a state of the vehicle; and
send one or more requests to the one or more server computing devices to perform the one or more of the plurality of options selected by the technician in order for the technician to resolve the issue.

2. The client computing device of claim 1, wherein the one or more server computing devices respond to the one or more requests after validating that the technician is qualified to make the one or more requests.

3. The client computing device of claim 1, wherein the one or more server computing devices respond to the one or more requests after validating that the technician has been assigned to the vehicle.

4. The client computing device of claim 1, wherein the one or more server computing devices respond to the one or more requests after validating that a time that the one or more requests were made corresponds to the technician's work shift.

5. The client computing device of claim 1, wherein the plurality of options includes a turn off do not service (DNS) option which enables the technician to send a request to the one or more server computing devices to make the vehicle hailable.

6. The client computing device of claim 1, wherein the plurality of options includes a publish option which causes the client computing device to send a notification to the one or more server computing devices indicating that the technician has arrived at the vehicle.

7. The client computing device of claim 1, wherein the plurality of options includes a hold option which enables the technician to send a request to the one or more server computing devices to request that the vehicle be brought to a stop in a safe manner, and then continue to remain stopped.

8. The client computing device of claim 1, wherein the plurality of options includes a park option which enables the technician to send a request to the one or more server computing devices to request that the vehicle shifts its gear to park.

9. The client computing device of claim 1, wherein the plurality of options includes a park option which enables the technician to send a request to the one or more server computing devices to request that the vehicle enter a state in which the autonomous driving mode can be switched to a manual driving mode.

10. The client computing device of claim 1, wherein the plurality of options includes a pullover option which enables the technician to send a request to the one or more server computing devices to request that the vehicle pull over at a nearby location chosen by the one or more server computing devices.

11. The client computing device of claim 1, wherein the plurality of options includes an end assistance option which enables the technician to send a notification to the one or more server computing devices indicating that the vehicle no longer requires the roadside assistance.

12. The client computing device of claim 1, wherein the display device is further configured to present a display bar identifying a current gear of the vehicle.

13. The client computing device of claim 12, wherein the current gear is drive or park.

14. The client computing device of claim 1, wherein the display device is further configured to present a display bar identifying a current driving mode or state of the vehicle.

15. The client computing device of claim 14, wherein the current driving mode is cruise, parked or fallback.

16. A method comprising:
receiving, by one or more processors of a client computing device used by a technician from one or more server computing devices, one or more notifications indicating that the technician has been assigned to provide roadside assistance to a vehicle having an autonomous driving mode, and information regarding a location and a state of the vehicle;
presenting, by the one or more processors on a display device of the client computing device, a plurality of options from which the technician selects one or more of the options to resolve an issue that caused the vehicle to require the roadside assistance; and
sending, by the one or more processors, one or more requests to the one or more server computing devices to perform the one or more of the plurality of options selected by the technician.

17. The method of claim 16, wherein the one or more server computing devices respond to the one or more requests after validating that the technician is qualified to make the one or more requests.

18. The method of claim 16, wherein the one or more server computing devices respond to the one or more requests after validating that the technician has been assigned to the vehicle.

19. The method of claim 16, wherein the one or more server computing devices respond to the one or more requests after validating that a time that the one or more requests were made corresponds to the technician's work shift.

20. The method of claim 16, wherein the plurality of options includes a turn off do not service (DNS) option which enables the technician to send a request to the one or more server computing devices to make the vehicle hailable.

* * * * *